US009153844B2

(12) United States Patent
Rijssenbeek et al.

(10) Patent No.: US 9,153,844 B2
(45) Date of Patent: Oct. 6, 2015

(54) SYSTEM AND METHODS OF USING A SODIUM METAL HALIDE CELL

(75) Inventors: Job Thomas Rijssenbeek, Niskayuna, NY (US); Michael Ernest Stoll, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 821 days.

(21) Appl. No.: 13/017,551

(22) Filed: Jan. 31, 2011

(65) Prior Publication Data

US 2012/0194140 A1 Aug. 2, 2012

(51) Int. Cl.

| | |
|---|---|
| ***H02J 7/04*** | (2006.01) |
| ***H01M 10/42*** | (2006.01) |
| ***H01M 10/652*** | (2014.01) |
| *H01M 10/39* | (2006.01) |

(52) U.S. Cl.

CPC ............ *H01M 10/42* (2013.01); *H01M 10/652* (2015.04); *H01M 10/39* (2013.01)

(58) Field of Classification Search

USPC .............. 320/134, 136, 150, 153; 429/11, 62, 429/442

See application file for complete search history.

(56) References Cited

U.S. PATENT DOCUMENTS

| | | | | |
|---|---|---|---|---|
| 3,976,503 | A * | 8/1976 | Minck et al. | 429/50 |
| 5,006,427 | A | 4/1991 | Bohm et al. | |
| 6,313,605 | B1 * | 11/2001 | Tsenter | 320/125 |
| 6,329,099 | B1 | 12/2001 | Oyama et al. | |
| 6,522,103 | B1 | 2/2003 | Miyoshi et al. | |
| 2005/0271935 | A1 * | 12/2005 | Fleming et al. | 429/160 |
| 2009/0169990 | A1 | 7/2009 | Gardner et al. | |
| 2009/0291365 | A1 * | 11/2009 | Iacovangelo et al. | 429/203 |
| 2010/0047672 | A1 | 2/2010 | Tamakoshi | |
| 2010/0178546 | A1 | 7/2010 | Rijssenbeek et al. | |

* cited by examiner

*Primary Examiner* — Edward Tso
*Assistant Examiner* — Aaron Piggush
(74) *Attorney, Agent, or Firm* — Francis T. Coppa

(57) ABSTRACT

An energy storage system can comprise: an energy storage device and a temperature management device and controller configured for establishing an intra-cell temperature gradient along the axis when the energy storage device is in an idle state. The energy storage device can have an axis and comprise a housing having an axis and an interior surface defining a volume; a separator disposed in the volume and having a first surface that defines at least a portion of a first chamber and a second surface that defines at least a portion of a second chamber; a cathodic material in ionic communication with the separator; and an electrolyte in ionic communication with the cathodic material and the separator. The first chamber can be in ionic communication with the second chamber through the separator.

20 Claims, 3 Drawing Sheets

Mean initial internal temperature = 295.5 °C
Mean initial external temperature = 300.1 °C Resistance (ohms)
Cycle #
0.012
0.0115
0.011
0.0105
0.01
0.0095
0.009
0.0085
0.008
0
200
400
600
800
1000
1200
1400
1
2
3
4

SYSTEM AND METHODS OF USING A SODIUM METAL HALIDE CELL

BACKGROUND

1. Technical Field

The disclosure relates to energy storage devices and in particular to a method of operating a sodium metal halide electrochemical cell.

2. Discussion of Art

Work has been done on rechargeable batteries that use sodium as the negative electrode. Sodium has a standard reduction potential of −2.71 volts (V), is relatively low weight, non-toxic, abundant, and economically desirable in the form of sodium chloride. The sodium anode can be used in liquid form, and the melting point of sodium is 98° Celsius (C.). An ion conducting solid electrolyte (separator) separates the liquid sodium anode from a positive electrode (cathode).

The cathode includes a material that can be oxidized/reduced upon charging/discharging the cell. Within the cathode, a liquid electrolyte transports ions to and from the separator on the cathode side. The sodium-ion conductivity of the two electrolytes, determines the minimum operating temperature of the battery. In the case where the liquid electrolyte is a molten salt, the melting point of the salt determines the minimum temperature.

U.S. Pat. No. 5,006,427 to Böhm et al, is directed to a storage battery. Böhm et al. express concerns regarding thermal overloads in the cells and disclose that an object of their invention is to construct cells of a battery in such a manner that uniform cooling of the cell is realized with low expenditures of energy for cooling and a minimal temperature gradient within the cells, with a simple battery configuration having simple interconnections.

US Patent Publication No. 2009/0169990 to Gardner et al. is directed to a battery design with asymmetrical terminals. The cell includes a plurality of electrode sheets separated by at least one separator sheet. A positive extension tab is attached to current collecting tabs of positive electrode sheets, and a negative extension tab is attached to current collecting tabs of the negative electrode sheets. The dimensions of the positive extension tab and the negative extension tab are selected such that temperature difference between the positive extension tab and the negative extension tab are minimized when the electrochemical cell is in use.

There is a continual desire in the industry to improve the power capability, energy content, cycle life, and/or calendar life of energy storage devices.

BRIEF DESCRIPTION

Disclosed herein are an energy storage system and a method for use thereof.

In one embodiment, a method for operating an energy storage device can comprise: imposing an idling axial temperature gradient across a cell of an energy storage device, wherein the temperature gradient is present when the energy storage device is in an idle state; and charging and/or discharging the energy storage device.

In another embodiment, a method for operating an energy storage device can comprise: setting an external, axial temperature gradient on an energy storage device to enhance an internal temperature gradient; and charging and/or discharging the energy storage device.

In one embodiment, an energy storage system can comprise: an energy storage device and a temperature management device and controller configured for establishing an intra-cell temperature gradient along the axis when the energy storage device is in an idle state. The energy storage device can have an axis and comprise a housing having an axis and an interior surface defining a volume; a separator disposed in the volume and having a first surface that defines at least a portion of a first chamber and a second surface that defines at least a portion of a second chamber; a cathodic material in ionic communication with the separator; and an electrolyte in ionic communication with the cathodic material and the separator. The first chamber can be in ionic communication with the second chamber through the separator.

These and other non-limiting details and characteristics are more particularly described below.

BRIEF DESCRIPTION OF THE DRAWING FIGURES

The following is a brief description of the drawings which are presented for the purposes of illustrating the exemplary embodiments disclosed herein and not for the purposes of limiting the same.

DETAILED DESCRIPTION

Figure 1:
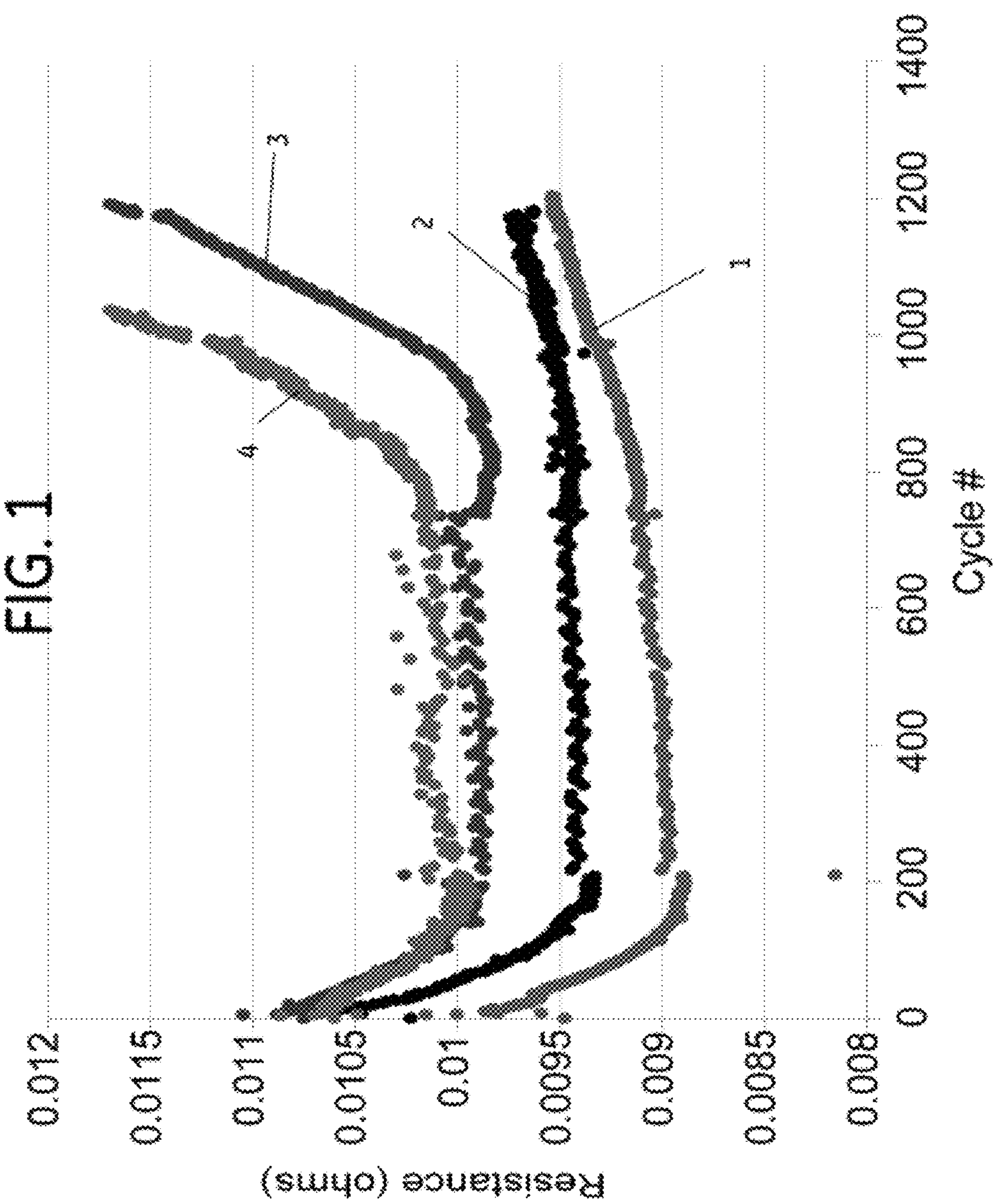
FIG. 1 is a graphical representation of resistance (ohms) versus number of cycles.

Sodium metal halide (e.g., sodium nickel chloride (Na—$NiCl_2$) energy storage devices or electrochemical cells (e.g., batteries) can be used in various standby power applications including uninterrupted power supply (UPS) and telecom. The imposition of a temperature gradient during electrochemical cycling of a sodium metal halide cell results in lower resistance and increased performance compared to cells that are cycled under isothermal conditions. In some embodiments, a temperature gradient is imposed on each cell and/or on the multi-cell module, e.g., through the use of heating (such as with a dual-zone heater) and/or cooling. In some embodiments, the heating/cooling is provided from outside the housing, while in other embodiments the heating/cooling is provided from inside the second chamber, or a combination thereof. In some embodiments, there are multiple heating/cooling zones that generate one or more thermal gradients. In one embodiment, the heating and/or cooling are set up such that the bottom zone of the cell (and/or cell stack) will be at a lower temperature than the top zone. Such a dual zone heating arrangement results in a vertical temperature gradient across the cell. In some embodiments, the housing and the heating and/or cooling elements are the same. In some embodiments, the internal heating/cooling elements also function as a current collector for the second chamber. It has been found that performance is enhanced with the temperature gradient, as compared to cells maintained at a uniform temperature. For example, cells with an imposed temperature gradient are able to discharge for a longer period of time at constant power before reaching a minimum voltage, or maintain at a higher voltage for a given discharge time, e.g. 15 minutes (see FIG. 1). The temperature gradient also improves cycle life for a given set of cell cycling conditions.

Heating/cooling may be provided to the cell(s) by conduction, convection or radiation. Convection may be passive or active (e.g., forced), and may involve a heat transfer fluid. Such a fluid may be a gas or a liquid. Gases may include air, nitrogen, or argon, or combinations thereof. Liquids may be organic or inorganic, and may include mineral oils, silicones, ionic liquids, liquid metals, or molten salts. Heat may come from sources internal or external to the energy storage device. In one embodiment, the heat source is a resistive heater. Power for heating/cooling and ancillary equipment (e.g., pumps for forced convection) may come from the energy storage device itself or from an external power source.

In one embodiment, an energy storage system comprises: an electrochemical cell and a temperature management device in thermal communication with the electrochemical cell and configured to establish a specified temperature gradient (i.e., a controlled temperature gradient) along the axis of the cell. As used herein "axis" refers to the main axis through the cell. The electrochemical cell includes a housing having an interior surface defining a volume. A separator is disposed in the volume. The separator has a first surface that defines at least a portion of a first compartment, and a second surface that defines at least a portion (and in some embodiments, all) of a second compartment, and the first compartment is in ionic communication with the second compartment through the separator. The first compartment comprises a metallic alkali metal and the second compartment comprises a cathode composition.

The housing can be sized and shaped to have a cross-sectional profile that is polygonal (e.g., square) or rounded (e.g., circular or cloverleaf) to provide maximal surface area for alkali metal ionic transport. The housing can be any appropriate size for the desired capacity, e.g., in some applications can have a width to length ratio that is greater than or equal to about 1:10. The housing can be formed from a material that is a metal, ceramic, or a composite. The metal can be, for example, nickel or steel, while the ceramic can be a metal oxide. In some embodiments, the housing is the heating and/or cooling element. For example, (i) if the housing is a composite, one component could be a resistive heater, while another component could be an insulator to isolate the heater from the active parts of the cell; and/or (ii) a part could be a thermoelectric that creates a temperature differential under an applied voltage (thereby heating or cooling the cell); and/or (iii) the housing could comprise channels for carrying a heat transfer fluid (e.g., gaseous and/or liquid).

The ionic material transported across the separator between the anode chamber and the cathode chamber can be an alkali metal. Exemplary ionic material can include sodium, lithium, and potassium, as well as combinations comprising at least one of the foregoing. The anodic material is molten during use. The first compartment or the anode compartment can receive and store a reservoir of anodic material. Exemplary additives for use in the anodic material include a metal oxygen scavenger such as manganese, vanadium, zirconium, aluminum, titanium, tantalum, or a combination comprising at least one of the foregoing. Other possible additives include materials that increase wetting of the separator surface by the molten anodic material. Additionally, some additives can enhance the contact or wetting between the separator and the current collector, e.g., to ensure substantially uniform current flow throughout the separator.

The separator is an alkali metal ion conductor solid electrolyte that conducts alkali metal ions during use between the first compartment and the second compartment. Exemplary separator materials include an alkali-metal-beta-alumina, alkali-metal-beta"-alumina, alkali-metal-beta-gallate, or alkali-metal-beta"-gallate. In one embodiment, the solid separator includes a beta-alumina, a beta"-alumina, or NASICON, as well as combinations comprising at least one of the foregoing. In one embodiment, the separator material includes a beta"-alumina. In one embodiment, a portion of the separator material is alpha alumina and another portion is beta"-alumina. The alpha alumina can be relatively more amenable to bonding (e.g., compression bonding) than beta"-alumina, and can help with sealing and/or fabrication of the energy storage device.

The crystal structure of the separator can optionally be stabilized by the addition of small amounts of lithium oxide (lithia), magnesium oxide (magnesia), zinc oxide, yttrium oxide (yttria), or similar oxides, as well as combinations comprising at least one of the foregoing. The fraction of the stabilizer to the separator material can be less than or equal to 20 weight percent based upon total weight of the separator material, (e.g., 0.5 wt % to 20 weight percent), specifically, 1 wt % to 10 wt %, and more specifically, 3 wt % to 5 wt %. The separator, sometimes referred to as beta"-alumina separator electrolyte (BASE), can include dopant(s).

As noted above, the separator is disposed within the volume of the housing. The separator can have a cross-sectional profile normal to the axis that is a circle, a triangle, a square, a cross, a star, or the like. Alternatively, the separator can be substantially planar. A planar configuration (or with a slight dome) can be useful in a prismatic or button-type battery configuration, where the separator is domed or dimpled. Similarly, the separator can be flat or undulate. In one embodiment, the solid separator can include a shape which can be flat, undulate, domed or dimpled, or comprises a shape with a cross-sectional profile that can be polygonal (e.g., triangle, rectangular, square, or the like), rounded (e.g., an ellipse, circle, and the like), and can optionally be multilobal (e.g., cross, star, and the like). The separator can be a tubular container in one embodiment having wall(s). The wall can have a thickness; and the ionic conductivity and the resistance across the wall can depend in part on the thickness. A suitable thickness can be less than or equal to about 5 millimeters.

Optionally, one or more shim structures can be disposed within the volume. The shim structures support the separator within the volume of the housing. The shim structures can protect the separator from vibrations caused by motion of the cell and thus reduce or eliminate movement of the separator relative to the housing. If present, the shim structures can function as a current collector.

The energy storage device can have a plurality of current collectors including anode current collectors and cathode current collectors, with the anode current collector(s) in electrical communication with the first chamber and the cathode current collector(s) in electrical communication with the contents of the second chamber. Exemplary materials for the anode current collector include titanium (Ti), nickel (Ni), copper (Cu), iron (Fe), carbon (C), as well as combinations comprising at least one of the foregoing, such as steel (e.g., stainless steel), nickel coated steel, and so forth.

The cathode current collector can be present in any suitable form, for example, a wire, paddle, sheet, and/or mesh. The cathode current collector comprises at least one metal and at least one salt. An exemplary cathode current collector comprises materials such as platinum (Pt), palladium (Pd), gold (Au), nickel (Ni), copper (Cu), carbon (C), molybdenum (Mo), tungsten (W), tantalum (Ta), and titanium (Ti), as well as combinations comprising at least one of the foregoing.

The plurality of current collectors can have a thickness of greater than or equal to about 1 millimeter (mm). The current collector(s) can be plated or clad (e.g., nickel clad steel). In some embodiments, the current collector is also the heating and/or cooling element.

The second chamber contains a cathodic material. The cathodic material can exist in elemental form or as a salt, depending on a state of charge. That is, the cathodic material is present in elemental form and/or salt form, and the ratio of the weight percent of the first cathodic material in elemental form to the weight percent of the salt form can be based on the state of charge. For example, a cathode composition can include transition metal(s) or a transition metal salt(s); alkali metal halide(s); salt(s) comprising alkali metal halide(s) and metal halide(s); and metal (poly)sulfide compound(s). The salt comprising an alkali metal halide and a metal halide can have a melting point of less than or equal to about 300° C. More specifically, the cathode metals(s) can comprise aluminum, iron, nickel, zinc, copper, chromium, tin, arsenic, vanadium, tantalum, niobium, tungsten, molybdenum, sodium, potassium, lithium, and iron, as well as combinations comprising at least one of the foregoing. In some embodiments, the cathodic metal has only one of iron, nickel, zinc, copper, or chromium. In some embodiments, the cathodic metal consists essentially of nickel. In other embodiments, the cathodic material includes two or more of metals selected from aluminum, iron, nickel, zinc, copper, chromium, tin, arsenic, tungsten, and molybdenum.

In some embodiments, the cathodic material comprises two cathodic materials, a first cathodic material and a second cathodic material. The first cathodic material can include aluminum, nickel, zinc, copper, chromium, and iron, as well as combinations comprising at least one of the foregoing. The second cathodic material, which is different from the first cathodic material, includes aluminum, nickel, zinc, copper, chromium, and iron, as well as combinations comprising at least one of the foregoing. In some embodiments, the first cathodic material can be present in an amount of less than or equal to 50 weight percent (wt %) (e.g., 20 wt % to 50 wt %), specifically, 30 wt % to 45 wt %, more specifically, 35 wt % to 41 wt %, based upon a total weight of the cathode material (including the liquid electrolyte). In some embodiments, the second cathodic material can be present in an amount of less than or equal to 10 wt % (e.g., 0.1 wt % to 10 wt %), specifically, 1 wt % to 7 wt %, more specifically, 2 wt % to 5 wt %, based upon a total weight of the cathode material. In some embodiments, the second cathodic material can be present in an amount of less than or equal to 1.0 wt %, specifically, less than or equal to 0.5 wt %, based upon a total weight of the cathode material.

Other additives can affect performance. Such performance additives can increase ionic conductivity, increase or decrease solubility of the charged cathodic species, reduce vapor pressure over the electrode, improve wetting of the solid electrolyte by the molten electrolyte, or prevent ripening of the cathode microdomains, to name several utilities. In one embodiment, the additive can be present in an amount that is less than about 5 mole percent compared to the total combined moles of alkali metal halide and aluminum halide.

A plurality of the electrochemical cells can be organized into an energy storage system. Multiple cells can be connected in series or parallel (or a combination thereof) to form a module, pack, or stack. For convenience, a group of coupled cells can be referred to as a module. The ratings for the power and energy of the module can depend on such factors as the number of cells in the module. Other factors can be based on end-use application specific criteria.

The electrochemical cell can be assembled in the discharged state. Applying a voltage between the anode and the cathode of the electrochemical cell can charge the electrochemical cell. In some embodiments, sodium chloride in the cathode dissolves into the electrolyte to form sodium ions and chloride ions. Sodium ions, under the influence of applied electrical potential, conduct through the separator and combine with electrons from the external circuit to form the sodium electrode, and chloride ions react with the cathodic material to form metal chloride and donate electrons back to the external circuit. During discharge, sodium metal donates electrons to the load and sodium ions conduct back through the separator reversing the reaction. The cell reactions are as follows (charging is to the right):

At positive electrode: $n\text{NaCl}+\text{M}\longleftrightarrow\text{MCl}_n+n\text{Na}^++ne^-$ At negative electrode: $n\text{Na}^++ne^-\longleftrightarrow n\text{Na}$ Overall: $n\text{NaCl}+\text{M}\longleftrightarrow\text{MCl}_n+n\text{Na}$ In one embodiment, the energy storage device can be rechargeable over a plurality of cycles. In another embodiment, the energy storage device can be employed in a variety of applications, and the plurality of cycles for recharge is dependent on factors such as charge and discharge current, depth of discharge, cell voltage limits, and the like.

In one embodiment of the energy storage device, a controller communicates with the plurality of the cells. The controller can distribute an electrical load to select cells in a cell module in response to feedback signals indicating states for each of the cells in the cell module. The controller can perform a warm-up method in which a series of heating elements are activated in a sequence to melt a frozen portion of the energy storage device in a determined manner.

In one embodiment of the energy storage system, the temperature management device comprises a controller in thermal communication with the plurality of the cells, e.g., via electrical relays/switche(s), thermocouple(s), and/or heating and cooling element(s), and so forth. An exemplary controller is a proportional-integral-derivative controller (PID controller). The controller can measure a value from a process or other apparatus and compare it with a reference setpoint value. The difference (or "error" signal) can be used to adjust some input to the process in order to bring the process-measured value back to its desired setpoint.

A temperature management device can be employed to attain the desired temperature of the cell and temperature gradient across the cell. The temperature management device can warm the energy storage device if too cold, and can cool the energy storage device if too warm. The temperature management system can include a control profile that can maintain a minimal heat level in the first and second chambers to avoid a freeze of cell materials. The temperature management system can include a thaw profile that controls the heating rate and heating location as the energy storage device is heated to operating temperature. The temperature management device can control heater(s) and/or cooler(s) (e.g., blowers and/or heat exchangers) so that a temperature gradient can be established and maintained across the cell, e.g., each individual cell, across the cell stack, or across selected cells of a group of cells. It is envisioned that the desired temperature gradient will be established and/or maintained with a plurality of thermal elements (e.g., heating and/or cooling elements). The thermal elements used for heating the energy storage device to operating temperature may be the same as, or different from, those used to establish and maintain the temperature gradient across the cell.

The temperature management device can be employed to impart a temperature gradient along the axis of the cell, e.g., during charging, idling, and/or discharging. The amount of the temperature gradient across a cell (along the axis) can be a difference (from one end of the cell to the other end of the cell (axially)), during idle, of greater than or equal to 10° C., specifically, greater than or equal to 20° C., and more specifically, greater than or equal to 25° C., and yet more specifically, greater than or equal to 40° C. For example, the temperature gradient from one end of the cell to the other, during idle, can be 20° C. to 100° C. (i.e., determined from opposite ends of the cell), specifically, 25° C. to 75° C. As noted, a temperature gradient can be applied to the cell during charge, idle, and/or discharge, wherein the gradient applied during each of those states can be the same or different as during another state.

In some embodiments, the energy storage device with the imposed temperature gradient has an imposed mean maximum internal temperature, and the same energy storage device with a uniform temperature across the cell (wherein the uniform temperature is the median of the imposed temperature gradient), and the difference between these mean internal temperatures of the energy storage device under these two conditions is less than or equal to 8° C., specifically, less than or equal to 5° C., and more specifically, less than or equal to 3° C. For example, for an imposed external temperature of 275° C. to 325° C. axially across a cell, the uniform temperature imposed on the uniform cell would be 300° C., and the difference in the mean internal temperatures for these two conditions would be less than or equal to 5° C. (see FIGS. 4 and 5).

In another embodiment the energy management system includes additional energy storage device(s) that differ from a first energy storage device. This dual energy storage device system can tune the ratio of power to energy in that a first energy storage device can be optimized for efficient energy delivery and a second energy storage device can be optimized for power delivery. The control system can draw from either energy storage device as needed, and charge back either energy storage device that needs such a charge.

Exemplary second energy storage devices, for power delivery, include a primary battery, a secondary battery, a fuel cell, an ultracapacitor, as well as combinations comprising at least one of the foregoing. A suitable secondary battery can be a lithium battery, lithium ion battery, lithium polymer battery, and/or a nickel metal hydride battery.

The energy storage device is further illustrated by the following non-limiting examples.

Example

Resistance Versus Number of Cycles

The energy storage devices in this example comprised cells with a sodium (Na) anode, nickel (Ni), and sodium chloride (NaCl) cathode with a zinc sulfide (ZnS) additive, and a sodium-aluminum chloride ($NaAlCl_4$) electrolyte. The cells were 32 ampere hour (Ah) nameplate cells. The initial 200 discharge cycles were at 120 watts (W) to a 15 minutes (min) or 1.8 volt (V) cutoff. These were followed by a random discharge time cycling protocol consisting of cycles with 15 second (sec), 1 min, 5 min, and 15 min discharges at 120 W to approximately cycle 700. Finally, the remaining discharges were at 120 W for 15 min or 1.8 V. All recharges were performed at 12 amperes (A) constant current to 2.67 V followed by 2.67 V constant voltage to 0.5 A. The cathode current collector contained two additional hollow ⅛ inch (3.2 millimeter (mm)) Ni tubes to facilitate the measurement of internal cathode temperature during testing. The tubes were fused shut at one end and open at the other.

The results of the testing are set forth in FIG. 1. As can be seen from the figure, the cell resistance versus cycle number for 4 single cells was determined. Lines 1 and 2 represent points that originated from the cells for which a dual-zone heater was employed with top half set at 325° C. and the bottom set at 275° C., for an average operating temperature of 300° C. Lines 3 and 4 represent points from 2 cells that were cycled under isothermal conditions at 300° C. Lines 1 and 2 showed lower overall resistance. The magnitude of resistance was lower for the cells cycled with an imposed axial temperature gradient (i.e., a gradient along the axis) and the increase in resistance with cycle number was less than for the cells cycled under isothermal conditions. As is evident from the graph, the intra-cell temperature gradient can be employed to decrease the cell resistance, for the same cell, by greater than or equal to 5%, and even greater than or equal to 10%. The axial temperature gradient can also be employed to decrease the resistance rise with cycles, thereby increasing the cycle life of the cells.

Figure 2:
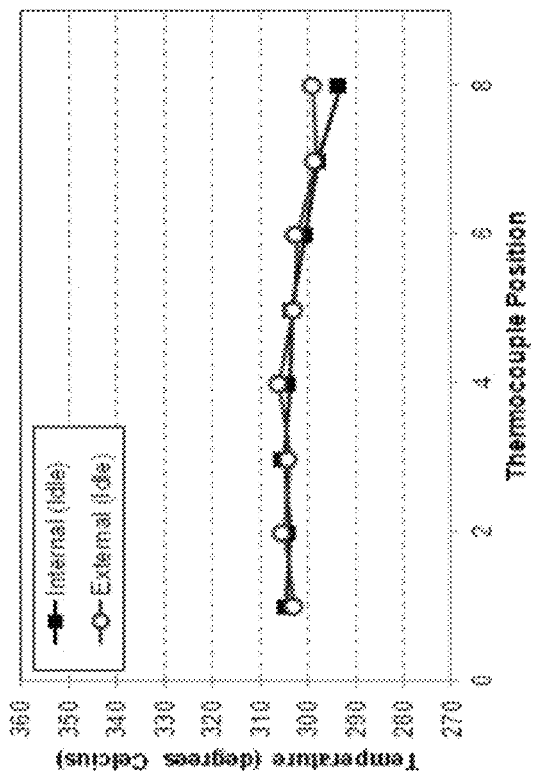
FIG. 2 is a graphical representation of an internal and external cell temperature during idle versus thermocouple position for a cell with a uniformly controlled cell temperature, wherein the thermocouples were evenly spaced axially along the cell.
Figure 3:
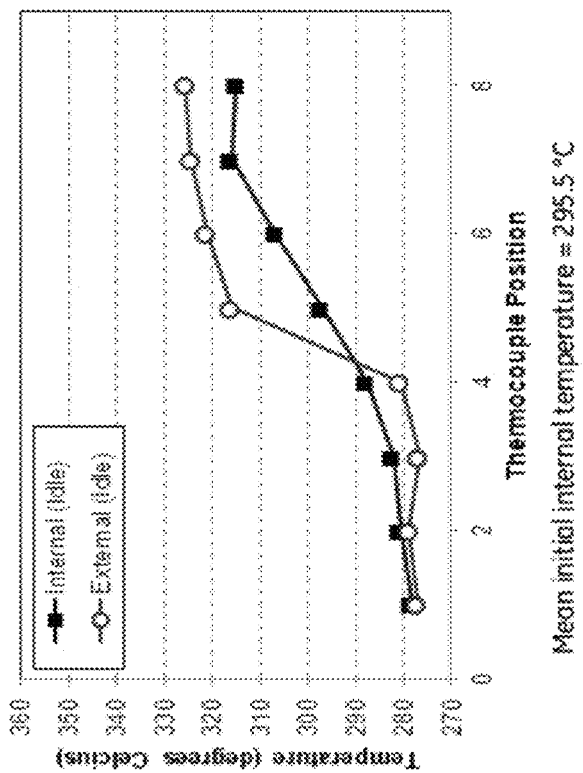
FIG. 3 is a graphical representation of an internal and external cell temperature during idle versus thermocouple position for a cell with an imposed temperature gradient, wherein the thermocouples were evenly spaced axially along the cell.

As can be seen from FIG. 2, during idle of a cell, with a uniformly controlled cell temperature, substantially no axial temperature gradient exists across the cell (less than 10° C. across the entire cell). However, for a cell with an imposed temperature gradient, FIG. 3, the gradient is substantially similar to the imposed gradient (approximately 35° C. across the cell). It is noted that in both of these tests, the thermocouples were evenly spaced along the cell.

Figure 4:
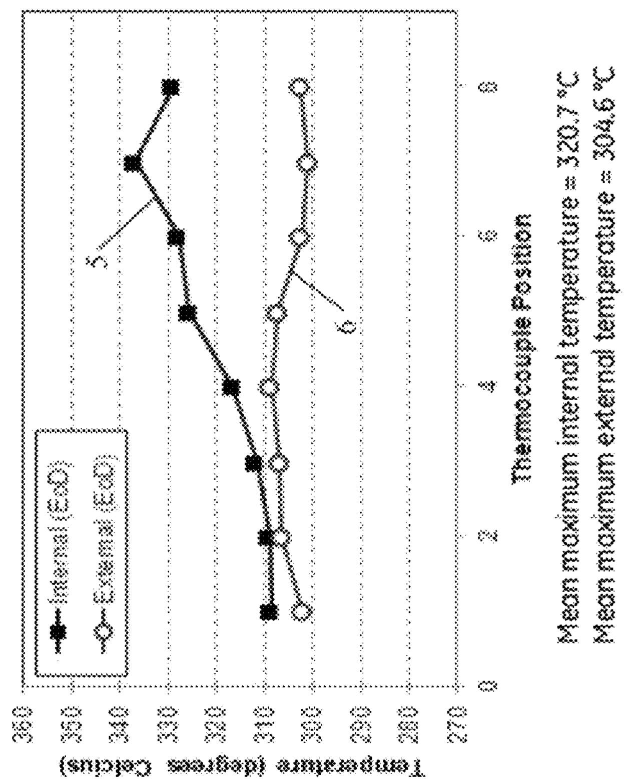
FIG. 4 is a graphical representation of an internal and external cell temperature at the end of discharge versus thermocouple position for a cell with a uniformly controlled cell temperature, wherein the thermocouples were evenly spaced axially along the cell.
Figure 5:
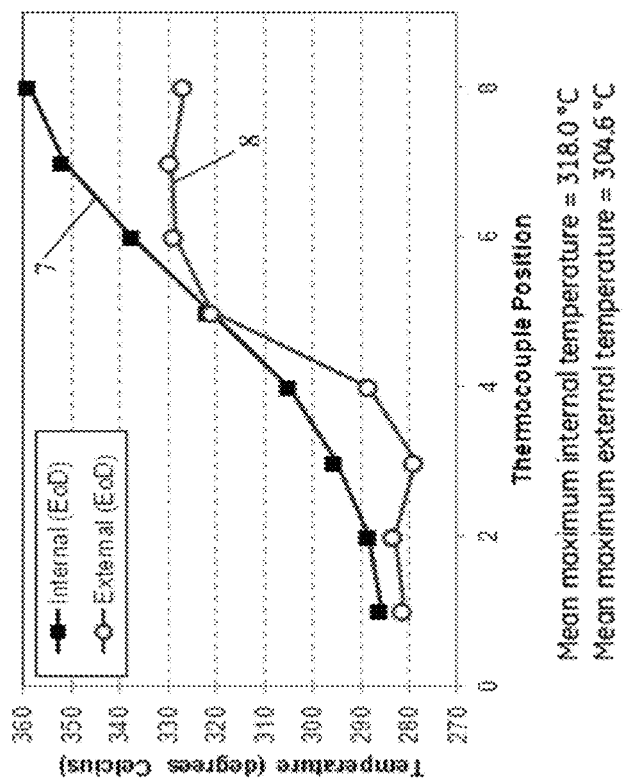
FIG. 5 is a graphical representation of an internal and external cell temperature at the end of discharge versus thermocouple position for a cell with an imposed temperature gradient, wherein the thermocouples were evenly spaced axially along the cell.

FIGS. 4 and 5 illustrate maximum internal (lines 5 and 7) and external (lines 6 and 8) cell temperatures at the end of discharge as a function of cell height (i.e., axially) during a 120 W discharge for a cell with a uniformly controlled cell temperature (FIG. 4) and a cell with an imposed temperature gradient (FIG. 5). The temperature set point for the uniformly controlled cell illustrated in FIG. 4 was 300° C. For the cell with an imposed temperature gradient illustrated in FIG. 5, the set points were 275° C. for the bottom half and 325° C. for the top half. Note that the mean temperatures in both cases are nearly the same (e.g., less than a 3° C. difference in the mean temperatures). As can be seen from the figures, the external temperature gradient on the uniformly controlled cell, between thermocouple position 1 and position 8, was less than 10° C., with the internal temperature gradient of less than 25° C. For the gradient imposed cell, the temperature gradient, between thermocouple position 1 and position 8, was greater than 48° C., with the internal temperature gradient of greater than 75° C. It is noted that the mean temperatures for both cells is substantially the same.

It is generally known to those skilled in the art that intra-cell thermal gradients should be minimized because they lead to one or more of the following depending on the cell technology: uneven use of the active material(s), uneven aging of the active material(s), concentration gradients, convection currents, water condensation, and/or thermal runaway. In the present system, however, controller(s) and/or thermal element(s) are used to create and/or maintain an intra-cell thermal gradient. Unexpectedly and contrary to conventional wisdom, the intra-cell temperature gradient can enhance cycle life and/or decrease cell resistance.

All ranges disclosed herein are inclusive of the endpoints, and the endpoints are independently combinable with each other (e.g., ranges of "up to 25 wt. %, or, more specifically, 5 wt. % to 20 wt. %", is inclusive of the endpoints and all intermediate values of the ranges of "5 wt. % to 25 wt. %," etc.). "Combination" is inclusive of blends, mixtures, alloys, reaction products, and the like. Furthermore, the terms "first," "second," and the like, herein do not denote any order, quantity, or importance, but rather are used to differentiate one element from another. The terms "a" and "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the film(s) includes one or more films). Reference throughout the specification to "one embodiment", "another embodiment", "an embodiment", and so forth, means that a particular element (e.g., feature, structure, and/or characteristic) described in connection with the embodiment is included in at least one embodiment described herein, and can or can not be present in other embodiments. In addition, it is to be understood that the described elements can be combined in any suitable manner in the various embodiments. Similarly, "free" can be used in combination with a term, and can include an insubstantial number, or trace amounts, while still being considered free of the modified term.

The foregoing example is illustrative of some features of the invention. The appended claims are intended to claim the invention as broadly as has been conceived and the example herein presented is illustrative of selected embodiments from a manifold of all possible embodiments. Accordingly, it is Applicants' intention that the appended claims not limit to the illustrated features of the invention by the choice of example utilized. As used in the claims, the word "comprises" and its grammatical variants logically also subtend and include phrases of varying and differing extent such as for example, but not limited thereto, "consisting essentially of" and "consisting of." Advances in science and technology can make equivalents and substitutions possible that are not now contemplated by reason of the imprecision of language; these variations should be covered by the appended claims.

What is claimed is:

1. A method for operating an energy storage device, comprising:
- setting a vertical temperature gradient along an axis of a cell of an energy storage device to apply an idling axial temperature gradient, wherein the vertical temperature gradient is present when the energy storage device is in an idle state; and
- charging and/or discharging the energy storage device.

2. The method of claim 1, comprising charging the energy storage device and maintaining a charging axial temperature gradient across the cell of the energy storage device.

3. The method of claim 2, wherein the charging axial temperature gradient is different than the idling axial temperature gradient.

4. The method of claim 1, wherein the idling axial temperature gradient is greater than or equal to 10° C., in a direction along the axis of the cell, from one end of the cell to the other end of the cell.

5. The method of claim 4, wherein the idling axial temperature gradient is greater than or equal to 20° C.

6. The method of claim 5, wherein the idling axial temperature gradient is 20° C. to 100° C.

7. The method of claim 1, comprising discharging the energy storage device and further comprising changing the idling axial temperature gradient during discharge.

8. The method of claim 1, wherein the energy storage device comprises a sodium anode.

9. The method of claim 1, wherein the energy storage device comprises a nickel cathode.

10. The method of claim 9, wherein the cathode of the energy storage device further comprises sodium chloride.

11. The method of claim 1, wherein the energy storage device comprises an alkali metal ion conductor solid electrolyte as a separator.

12. The method of claim 11, wherein the solid electrolyte comprises beta"-alumina.

13. The method of claim 1, wherein the energy storage device is a sodium metal halide battery that comprises a beta"-alumina solid electrolyte.

14. A method for operating an energy storage device, comprising:
- setting a first temperature at a bottom end and a second temperature at a top end of a cell of an energy storage device with a temperature management device to apply an idling axial temperature gradient, wherein the second temperature is higher than the first temperature; and
- charging and/or discharging the energy storage device.

15. The method of claim 14, comprising charging the energy storage device and enhancing a charging axial temperature gradient across the cell of the energy storage device, and wherein the charging axial temperature gradient is different than the idling axial temperature gradient.

16. The method of claim 14, comprising discharging the energy storage device and enhancing a discharging axial temperature gradient across the cell of the energy storage device, and wherein the discharging axial temperature gradient is different than the idling axial temperature gradient.

17. The method of claim 14, wherein the idling axial temperature gradient is greater than or equal to 20° C.

18. The method of claim 17, wherein the idling axial temperature gradient is greater than or equal to 40° C.

19. An energy storage system, comprising:
- an energy storage device comprising:
  - a housing having an axis and an interior surface defining a volume;
  - a separator disposed in the volume and having a first surface that defines at least a portion of a first chamber and a second surface that defines at least a portion of a second chamber, wherein the first chamber is in ionic communication with the second chamber through the separator;
  - a cathodic material in ionic communication with the separator; and
  - an electrolyte in ionic communication with the cathodic material and the separator; and
- a temperature management device comprising a controller, wherein the temperature management device is configured for setting and controlling a vertical temperature gradient along the axis when the energy storage device is in an idle state.

20. The energy storage system of claim 19, wherein the temperature management device is configured for setting a first temperature at a bottom end and a second temperature at a top end of the energy storage device, wherein the second temperature is higher than the first temperature.

* * * * *